US011800264B2

(12) United States Patent
Han et al.

(10) Patent No.: US 11,800,264 B2
(45) Date of Patent: Oct. 24, 2023

(54) CONTROL PLANE FOR AN OPTICAL NETWORK FOR TRANSMITTING MULTI-CARRIER DATA BURSTS WITH DYNAMIC ADAPTATION OF LEARNING SEQUENCE

(71) Applicant: Orange, Issy-les-Moulineaux (FR)

(72) Inventors: Bing Han, Lannion (FR); Paulette Gavignet, Tregastel (FR); Erwan Pincemin, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 337 days.

(21) Appl. No.: 16/969,871

(22) PCT Filed: Feb. 14, 2019

(86) PCT No.: PCT/FR2019/050324
§ 371 (c)(1),
(2) Date: Aug. 13, 2020

(87) PCT Pub. No.: WO2019/158861
PCT Pub. Date: Aug. 22, 2019

(65) Prior Publication Data
US 2020/0413168 A1 Dec. 31, 2020

(30) Foreign Application Priority Data
Feb. 16, 2018 (FR) ...................................... 1851325

(51) Int. Cl.
*H04J 14/00* (2006.01)
*H04Q 11/00* (2006.01)
(Continued)

(52) U.S. Cl.
CPC ...... *H04Q 11/0066* (2013.01); *H04J 14/0298* (2013.01); *H04Q 11/0435* (2013.01); *H04Q 2011/0033* (2013.01)

(58) Field of Classification Search
CPC .......... H04Q 11/0066; H04Q 11/0067; H04Q 11/0003; H04Q 11/0005; H04Q 11/0435;
(Continued)

(56) References Cited

U.S. PATENT DOCUMENTS

2017/0230134 A1* 8/2017 Gavignet ............ H04L 27/0008

FOREIGN PATENT DOCUMENTS

| FR | 3024622 A1 | 2/2016 |
| WO | WO 02071791 A2 | 9/2002 |
| WO | WO 2016/020602 | 2/2016 |

OTHER PUBLICATIONS

Cazzaniga, Giorgio, et al. "A new perspective on burst-switched optical networks." *Bell Labs Technical Journal* 18.3 (2013): 111-131.
(Continued)

*Primary Examiner* — Hanh Phan
(74) *Attorney, Agent, or Firm* — Knobbe, Martens, Olson & Bear, LLP

(57) ABSTRACT

A system for sending data in an optical network comprising a plurality of source nodes and destination nodes is disclosed. In one aspect, a source node generates, in a spectral band that is associated with it, a multi-carrier optical data signal obtained by modulation of a source signal at a source wavelength and sends it in the form of single-band data bursts that can be associated with distinct source wavelengths. A single-band data burst comprises, in addition to payload data symbols (PL), a sequence of learning symbols (TS) composed of a plurality of learning symbols. A control unit belonging to the control plane of the optical network determines, for at least one of the source nodes, instants of sending of the single-band data bursts and source wavelengths to be used for sending these single-band data bursts, as a function of a path time of the data bursts between the source node and one of the destination nodes associated with
(Continued)

the source wavelength. The control unit also determines the size of the sequence of learning symbols (TS) of the single-band data bursts.

15 Claims, 7 Drawing Sheets

(51) Int. Cl.
  *H04J 14/02* (2006.01)
  *H04Q 11/04* (2006.01)
(58) Field of Classification Search
  CPC .... H04J 14/02; H04J 14/0298; H04J 14/0227; H04J 14/0267; H04J 14/0223; H04B 10/2507
  USPC ........ 398/45, 47, 48, 49, 50, 51, 52, 53, 56, 398/57, 58, 59, 75, 76, 79, 135, 136, 158, 398/159, 46, 54, 55
  See application file for complete search history.

(56) References Cited

OTHER PUBLICATIONS

Fabrega, J. M., et al. "Experimental demonstration of elastic optical networking utilizing time-sliceable bitrate variable OFDM transceiver." OFC 2014. IEEE, 2014.

Gavignet, Paulette, et al. "Time and spectral optical aggregation for seamless flexible networks." *2015 International Conference on Photonics in Switching (PS)*. IEEE, 2015.

Jansen, S. L. et al. "Long-haul transmission of 16×52.5 Gbits/s polarization-division-multiplexed OFDM enabled by MIMO processing (Invited)," J. Opt. Netw. 7, 173-182 (2008).

Jansen, S. L., et al. "20-GB/s OFDM transmission over 4,160-km SSMF enabled by RF-pilot tone phase noise compensation." *National Fiber Optic Engineers Conference*. Optical Society of America, 2007.

Pincemin, Erwan, et al. "Multi-band OFDM transmission at 100 Gbps with sub-band optical switching." *Journal of lightwave technology* 32.12 (2014): 2202-2219.

Pincemin, Erwan, et al. "Multi-band OFDM transmission with sub-band optical switching." (2013): 762-764.

Sadeghioon, Lida, et al. "First experimental demonstration of real-time orchestration in a Multi-head metro network." *2014 16th International Conference on Transparent Optical Networks (ICTON)*. IEEE, 2014.

Sadeghioon, Lida, et al. "Software-based burst mode reception implementation for timedomain wavelength interleaved networks." *2015 European Conference on Optical Communication (ICOC)*. IEEE, 2015.

Triki, Ahmed, et al. "Efficient control plane for passive optical burst switching network." *The International Conference on Information Networking 2013 (ICOIN)*. IEEE, 2013.

International Search Report dated Aug. 22, 2019, issued in Patent Cooperation Treaty Application No. PCT/FR2019/050324.

* cited by examiner

CONTROL PLANE FOR AN OPTICAL NETWORK FOR TRANSMITTING MULTI-CARRIER DATA BURSTS WITH DYNAMIC ADAPTATION OF LEARNING SEQUENCE

CROSS-REFERENCE TO RELATED APPLICATIONS

Related Applications

This application is filed under 35 U.S.C. § 371 as the U.S. National Phase of Application No. PCT/FR2019/050324 entitled "CONTROL PLANE FOR AN OPTICAL NETWORK FOR TRANSMITTING MULTI-CARRIER DATA BURSTS WITH DYNAMIC ADAPTATION OF LEARNING SEQUENCE" and filed Feb. 14, 2019, and which claims priority to FR 1851325 filed in France on Feb. 16, 2018, each of which is incorporated by reference in its entirety.

BACKGROUND

Field

The field of the invention is that of optical communications networks. More specifically, the invention relates to the improvement of the use of network resources in such optical networks.

Description of the Related Technology

The exponential growth of the volume of data exchanged in optical communications networks is dictating a constant increase in the bit rate of transmission interfaces, which is today reaching 100 Gbit/s and more.

The downside of this increase in the bit rate of interfaces is that the filling of the transmission channels can be relatively inefficient if it is not done by electronic aggregation, which is costly in terms of optical/electrical/optical (O-E-O) conversion and uneconomical in terms of energy.

However, there are several optical solutions that can be used to access the sub-wavelength granularity and thus lead to a better use of resources by filling the transmission channels more efficiently.

Among these, the SLPSN (Sub-Lambda Photonically Switched Networks) solution (as described especially in "*Terms and definitions for Sub-Lambda Photonically Switched Networks*", *ITU, COM*15-C2322 *Rev.-E, Geneva, August* 2012) uses the time domain. This solution relies on photonic switching of temporal slices of wavelength known as bursts, slots or more generally SLPS Units (SLPSU): it consists in gathering together a certain number of packets, intended for a same end node, in a single burst. This way of operating gives lengthier bursts than in the case of native IP packets and thus relaxes the technical constraints (processing speed) at the level of the nodes.

Among the most promising SLPSN solutions, the one based on passive TWIN (Time-domain Wavelength Interleaved Networking) routing as described in A. Triki et al., "*Efficient control plane for passive optical burst switching network*", *ICOIN* 2013, pp. 535-540, combines wavelength directing and planning of access to the wavelength. Wavelength directing is based on the pre-configuration of color trees. The directing of a burst is for example carried out by coloring it, when it is sent, on the wavelength corresponding to the tree to be travelled on. The burst is thus directed or branched out towards the root (or destination) of the tree. This directing or branching out technique makes it possible to avoid fast-switching devices in the nodes traversed (core nodes of the network) while the programming of the allocations of the wavelengths to the trees enables the efficient use of the optical resources (transmitters, receivers, wavelength channels) without any collision loss.

In order to increase the flexibility of the optical layer, two of the inventors of the present patent application have proposed the Time and Spectral Optical Aggregation (TISA) solution in Gavignet et al. "*Time and Spectral Optical Aggregation for Seamless Flexible Networks*", *Photonics in Switching*, 2015, *WeIII*3-1, as well as in the patent application WO2016/020602. TISA combines the TWIN solution and MB-OFDM (Multi-Band Orthogonal Frequency-Division Multiplexing) technology described by E. Pincemin et al. in "*Multi-band OFDM Transmission with Sub-band Optical Switching*", *Proc. ECOC* 2013, *Th.2.A.*1, making it possible to attain a level of sub-wavelength granularity in the time and spectral domains.

TISA enables a purely optical aggregation with the finest possible granularity, thus making it possible to respond more flexibly to customers' requests while at the same time achieving a better use of resources already deployed in networks. The aggregation, the routing and the separation of the data are carried out transparently as a function of the wavelength. This combination of two solutions, namely the temporal and spectral solution, for access to sub-wavelength granularity in an optical transmission network greatly increases the capacity of the networks in offering a granularity that is as fine as possible while enabling an increase in bit rates per channel up to the terabit level (or even beyond) and offers increased flexibility as compared with prior-art techniques.

According to this TISA solution, each source node of the optical network sends OFDM data in the form of bursts, which occupy only one spectral sub-band. Each spectral sub-band is associated with a destination node of the optical network, within which a coherent receiver is adapted to receiving the OFDM bursts sent out in the spectral sub-band associated with the destination node: the term used is "tuning at source" which means that each source node sends out a single-band data burst at the wavelength of the destination node with which it seeks to communicate.

These bursts of data are built by time slicing of an OFDM type multi-carrier signal obtained by OFDM multi-carrier modulation of a colored source signal on which the digital data to be transmitted are imprinted. The wavelength of the source signal and therefore the color of the signal can vary from one data burst to the next, depending on the destination node for which the data are intended. Each of the source nodes therefore sends out OFDM single-band data bursts in independent spectral sub-bands. The source nodes can send out bursts at each of the wavelengths of the different destination nodes.

In addition, a combination module or sub-band combiner receives all the single-band data bursts coming from the source nodes and couples them in multi-band OFDM (MB-OFDM) data bursts.

In order that these MB-OFDM data bursts be perfectly combined in the sub-band combiner, a control architecture relying on a specific control plane makes it possible to control the times of sending of the single-band bursts by the different source nodes so that they simultaneously reach the sub-band combiner in order to be combined therein into multi-band bursts. Such a control plane relies on a precise knowledge of the path times of the single-band data bursts in the optical network between each of the source nodes and the sub-band combiner. It furthermore makes it possible, as in the TWIN technique for example, to avoid collision in the optical network and to manage contention within the network and in the destination nodes. Such a control architecture can be centralized or distributed.

At a source node, a single-band data burst contains one or more OFDM frames each composed of a synchronization symbol, several learning symbols, and payload data symbols. The algorithms described by E. Pincemin et al. in "Multi-band OFDM Transmission with Sub-band Optical Switching", Proc. ECOC 2013, Th.2.A.1 or in "Multi-band OFDM Transmission at 100 Gbps with sub-band Optical Switching", Journal of Lightwave Technology, 2014, for digital signal processing (DSP) are used to generate OFDM bursts in a source node and receive them in a destination node. FIGS. 1A and 1B illustrate the different steps of the digital processing of the OFDM signal thus implemented on the transmitter side and the receiver side.

As illustrated in FIG. 1A, binary data 101 are incident to the input of the digital processing part. They pass through a series/parallel converter 102 and are then converted into symbols by the "symbol mapping" module referenced 103. Pilot sub-carriers are spectrally inserted into the payload sub-carriers by the module referenced 104 in order to estimate the phase noise generated by the transmission chain (comprising the transmitter Tx, the optical fiber and the receiver Rx). Then, reference symbols (also called learning symbols) enabling the equalization of the transmission channel at reception are added by a module referenced 105; the synchronization symbol used for the temporal synchronization is inserted by a module referenced 106. The processing chain also comprises an IFFT module 107 carrying out an inverse Fourier transform that transforms the signal from the frequency domain to the time domain. A module referenced 108 enables the introduction, at the start of each OFDM symbol, of a cyclic prefix. Such a cyclic prefix absorbs the chromatic dispersion (CD—corresponding to the variations in propagation time of the different wavelengths in the optic fiber) and the polarization modal dispersion (PMD—the difference in speeds of groups between the modes that get propagated along the different axes of polarization of the optical fiber). Such a cyclic prefix classically consists of a copy of the terminal part of the OFDM symbol.

The signal then undergoes a parallel/series P/S conversion 109 and a clipping in a module referenced 110 which reduces peak-to-average-power ratio (PAPR). At the output of this digital signal processing chain, we obtain the two components, namely an in-phase and an in-quadrature (I and Q) component, of the signal.

FIG. 1B illustrates the digital signal processing carried out in the receiver, which is the inverse of the process implemented in the transmitter.

The time synchronization 111 is performed to retrieve the start of the OFDM frame. After the compensation 112 for the carrier frequency offset or CFO and the series-parallel conversion 113, the cyclic prefix is eliminated in the module referenced 114. Through the cyclic prefix, the impact on the payload data of the chromatic dispersion CD and of the polarization modal dispersion PMD is zero. A fast Fourier transform (FFT) 115 transforms the signal from the time domain into the frequency domain. Then, the channel equalization 116 and the phase noise compensation 117 are carried out by means of learning symbols and pilot carrier frequencies. Finally, the last step consists in retrieving the binary data 120 from the payload symbols (symbol demapping 118 and parallel/series conversion 119).

During the equalization process implemented in the receiver, the channel estimation module 116 estimates the channel from the learning symbols inserted into the OFDM frame at the time of sending. The conventional equalization algorithm, described for example in E. Pincemin et al, "Multi-band OFDM Transmission at 100 Gbps with sub-band Optical Switching", Journal of Lightwave Technology, 2014, consists in computing, symbol after symbol, the coefficients of the channel equalizer by comparing the learning symbols sent out and received and in taking an average of the coefficients of the equalizer on the learning symbols (i.e. in the time domain) in order to increase the robustness of the equalizer towards the different noise sources.

In an optical data transmission network implementing the TISA solution, the traffic is sent out in the form of data bursts so that the receivers of the destination nodes of the network are not assured of receiving a stream of symbols continuously. When a receiver does not receive data, only noise is present at the input of the receiver: this part of the signal is called a "gap" or an "absence of signals". In a TISA type optical network, there are therefore gaps from time to time at the input of the receiver and the duration of these gaps is variable. The duration of a small-sized gap is generally considered to be smaller than 5 microseconds and that of a large-sized gap to be greater than 20 microseconds.

Since the receiver is designed to receive a stream of signals continuously, it has difficulty in managing the absence of signals, and this entails a penalty. If the OFDM burst reaches a receiver after a lengthy "gap", the first hundreds of nanoseconds of a signal frame (especially the learning symbols) undergo a distortion because of transient response phenomena of the electronic components embedded in the receiver. A mismatch then appears between the effectively computed coefficients of the channel equalizer and the coefficients to be really applied to the received signal in order to equalize it accurately.

In order to obtain a more precise analysis of the influence of this distortion, the performance of the OFDM frame has been evaluated for different durations of "gaps" at the input of the receiver. FIG. 2 illustrates the results of this evaluation in the form of curves of binary error rates (BER) as a function of the optical signal-to-noise ratio (OSNR) measured in the different configurations.

For each configuration, we consider a 16QAM OFDM (QAM=Quadrature Amplitude Modulation) frame comprising one synchronization symbol, 14 learning symbols and 156 data symbols with a total duration of 4.7 microseconds. In FIG. 2, the curve with dot-shaped markers represents the result measured when the receiver works in continuous mode. The curves with markers shaped as squares, diamonds, triangles and circles respectively represent the results measured in burst mode with of 0.3, 5.3, 15.3 and 50.3 microsecond gaps at reception. As can be seen in FIG. 2, the penalty for a binary error rate BER equal to $2 \times 10^{-5}$ increases when the duration of the gap preceding the reception of the OFDM frame increases.

In order to resolve this problem, L. Sadeghioon et al. have proposed, in "Software-based burst mode reception implementation for time-domain wavelength interleaved networks", 2015 European Conference on Optical Communication (ECOC), Valencia, 2015, pp. 1-3, to add padding bursts at the input of the receiver when there are gaps in order to create a quasi-continuous stream of signals and therefore to keep the receiver always in the continuous operating state for which it is designed. This method of the prior art uses the control plane (and especially the command signals called "grants") to identify the presence of gaps in the receiver. A transmitter generates the padding bursts at the input of the receiver.

This method, although efficient, appreciably increases the complexity of the entire transmission chain and therefore proves to be costly.

Another solution to this problem consists in changing the electronic components of the receiver so that it has a low low-cutoff frequency that does not cause distortions in the signals. In this way, the receiver preserves the same behavior in the presence or in the absence of a signal.

Nevertheless, the design and manufacture of the opto-electronic wideband components enabling the transmission of the signals at high bit rate (over 10 Gbit/s) while presenting a very low low-cutoff frequency (of the order of some hundreds of Hz or some kHz) is not an easy matter, and such components therefore prove to be costly and difficult to develop.

There is therefore a need for a simple and low-cost technique for improving channel equalization performance at reception in an optical network in which the data are transmitted in the form of data bursts comprising one or more OFDM signal frames.

There is also a need for such a technique that is adapted equally well to optical networks implementing a TISA type solution and to a TWIN type solution with OFDM modulation.

There is also a need for such a technique that optimizes the payload bit rate within the optical network.

SUMMARY OF CERTAIN INVENTIVE ASPECTS

The invention responds to these needs by proposing a system for transmitting data in an optical network comprising a plurality of source optical nodes and destination optical nodes. In such an optical network, a source node is capable of generating a multi-carrier optical data signal obtained by modulation of a source signal at a source wavelength and sending said multi-carrier optical data signal in the form of single-band data bursts that can be associated with distinct source wavelengths. A single-band data burst comprises, in addition to payload data symbols, a sequence of learning symbols composed of a plurality of learning symbols.

In addition, in the control plane, a control unit is capable of determining, for at least one of the source nodes, instants of sending of single-band data bursts and source wavelengths to be used for sending single-band data bursts, as a function of a path time of the data bursts between the source node and the destination node, associated with the source wavelength.

According to the invention, this control unit also determines a size of the sequence of learning symbols of the single-band data bursts.

Thus, the invention relies on a wholly novel and inventive approach to the use of resources in an optical network working in "burst" mode, an approach according to which the size of the learning sequence of the frame of the multi-carrier signal is variable, and dynamically adaptable for each of the source nodes by means of the control plane established by the centralized control unit of the network. The technique of the invention thus advantageously proposes to augment the capacities of the control plane which, in addition to the instants of sending data bursts and the associated source wavelengths, also pilots the size of the learning sequences of the data bursts transmitted by the source nodes. This size of the learning sequence is preferably expressed in the form of an integer number of learning symbols contained in the sequence. It can also be expressed in the form of a desired duration of this sequence, that can be expressed in time units.

Indeed, as indicated here above, the transient response phenomena of the opto-electronic components embedded in the receiver of a destination node that arise when the receiver does not work in continuous mode cause distortion in the start of the multi-carrier signal frame received and therefore especially the learning symbols used for the channel estimation, thus inducing errors of equalization of the signal. An increase in the duration or size of the learning sequence of a multi-carrier signal frame makes it possible, as shall be seen in greater detail here below, to improve the channel equalization performance of the receiver, in the event of reception of data bursts following a signal absence of prolonged duration at the input of the receiver. However, a systematic increase, for all the data bursts sent by all the source nodes of the network, of the duration of the learning sequence would unnecessarily reduce the payload bit rate of the data in the network.

A dynamic matching of the size of the learning sequence, finely piloted by the centralized control unit establishing the control plane, optimizes the use of the network resources as a function of the conditions of transmission while at the same time reducing the penalty introduced by the receivers of the destination nodes owing to their operation in "burst" mode.

It will be noted that, without loss of generality, the data bursts can also contain, in addition to payload data symbols and the sequence of learning symbols, a header of data necessary for the management of the optical network such as network operation, administration and maintenance (OAM) data or again data on the content of the bursts (number of Ethernet frames, IP frames, etc.) or again any other relevant data (FEC (Forward Error Correction) code: "error correction code", etc.)

According to a first characteristic of the invention, the control unit comprises a module for sending command signals intended for the source nodes and compliant with the control plane, comprising:
- a piece of information on an instant of sending of the single-band data bursts;
- a piece of information on a source wavelength to be used for the sending of single-band data bursts;
- a piece of information on a size of the sequence of learning symbols of the single-band data bursts.

Such command signals, also called "grants" are transmitted by the control unit to the source nodes to control the sending of bursts. Such grants classically contain information on the wavelength used and the instants of sending. According to the invention, a novel form of control plane is proposed, wherein the structure of the multi-carrier frame and especially the integer number of learning symbols is used as a parameter in these "grants" to enable an adaptation of the size of the learning sequence in the bursts.

It will be noted that a burst can contain one or more OFDM frames and therefore one or more learning sequences. The size of the learning sequence can be defined for all the frames contained in a same burst, or frame by frame, the first frame of the burst possibly containing a learning sequence that is lengthier than the following ones. The adaptation of the size of the learning sequence is therefore burst by burst, or packet of bursts by packet of bursts, according to the refresh rate performed by the control unit or according to a predefined sending pattern.

According to one aspect of the invention, the control unit comprises a module for computing:
- a duration of absence of signal at input of at least one of the destination nodes, as a function of the instants of sending of the single-band data bursts by the source nodes and the path time of the data bursts between the source nodes and the destination node;
- the size of the sequence of learning symbols of the single-band data bursts intended for the destination node as a function of the computed duration of absence of signal.

Indeed, in such an optical network (for example of the TISA type), the routing of the signals is based on the wavelength, and each wavelength is associated with a destination (tuned to the source). The transmission path from a source node to a destination node is therefore foreseeable and the control unit can determine the time of propagation of a burst of data between the source node and the destination node. Since the instants of sending of the data bursts by a source node are controlled by the control plane established by the control unit, this unit can foresee the time of arrival of the bursts at destination and hence the duration of the gaps between the successive bursts at the receiver. The control unit can then deduce therefrom the optimal duration of the learning sequence, and hence its size in number of symbols, to obtain the best equalization performance at the receiver.

According to another aspect, the control unit also comprises a module for receiving information on reception performance in the reception of single-band data bursts from the destination nodes, and the computation module is capable of updating the size of the sequence of learning symbols of the single-band data bursts as a function of information on reception performance received by the control unit.

Thus, the size of the learning sequence for the bursts can be optimized as a function of the feedback received from the receiver on the quality of reception of the bursts previously transmitted, for which the size of the learning sequence was known to the control unit.

The invention also relates to an optical source node of an optical network comprising a plurality of source nodes and destination nodes. Such an optical source node comprises a module for generating a multi-carrier optical data signal obtained by modulation of a source signal at a source wavelength and a module for sending the multi-carrier optical data signal in the form of single-band data bursts that can be associated with distinct source wavelengths; a single-band data burst comprises, in addition to the payload data symbols, a sequence of learning symbols comprising a plurality of learning symbols. Such a source node also comprises a reception module for receiving command signals comprising a piece of information on an instant of sending of the single-band data bursts and a piece of information on a source wavelength to be used for sending single-band data bursts.

According to the invention, the command signals also comprise a piece of information on the size of the sequence of learning symbols of the single-band data bursts and the generation module comprises means for adapting the size of the sequence of learning symbols of the single-band data bursts as a function of the information received.

The invention also relates to a destination optical node of an optical network comprising a plurality of source nodes and destination nodes. Such a destination node comprises a first reception module for reception of optical bursts of a multi-carrier data signals, obtained by modulation of a source signal at a source wavelength, a burst comprising, in addition to the payload data symbols, a sequence of learning symbols comprising a plurality of learning symbols. This first reception module comprises a channel equalizer comprising a means for computing channel equalization coefficients from the sequence of learning symbols.

According to the invention, such a destination node also comprises a second module for receiving command signals comprising a piece of information on a size of the sequence of learning symbols of the single-band data burst and the channel equalizer takes account of the piece of information on a size of the sequence of learning symbols for computing equalization coefficients.

According to one aspect of the invention, said means for computing channel equalization coefficients are iterative computing means implementing:
- a computation of the channel equalization coefficients by averaging a subset of learning symbols of the learning sequence;
- a computation of a binary error rate affecting payload data obtained at output of the first reception module from channel equalization coefficients computed on the subset of learning symbols;
- an offset of the subset of learning symbols within the learning sequence.

In addition, the channel equalizer comprises means of comparison of the binary error rates computed for each of the subsets of successive learning symbols and means of selection, as equalizing coefficients to be applied by the channel equalizer, of the channel equalizing coefficients obtained by taking the average on the first subsets of learning symbols associated with a computed binary error rate below a determined threshold.

Thus, the solution of the invention relies on an increase in the size of the learning sequence relative to a classic multi-carrier frame and on a computation of the average of the coefficients of the equalizer, no longer on all the symbols of the learning sequence but on only a subset of these learning symbols. Since the start of the frame has undergone distortion owing to the transient phenomena inherent in the presence of gaps at input of the receiver, it is proposed to use the coefficients of the equalizer on a part of the learning sequence that undergoes no distortion or little distortion. To this end, a sliding window encompassing a subset of learning symbols, on which the equalization coefficients are averaged, is set up. The procedure is done iteratively, by gradually shifting this sliding window and by computing, for each position of this sliding window, the binary error rate affecting the data obtained in carrying out the channel equalization from the learning symbols of this position of the sliding window. Whatever the duration of the "gaps" at input of the receiver, there is a position of the sliding window from which the binary error rate gets stabilized, at a level substantially equal to (possibly slightly higher than, with a slight residual penalty possibly remaining) that obtained when the receiver functions in "continuous" mode. From this position, in which the coefficients of the equalizer get stabilized, it can be considered that the transient phenomena no longer affect the equalization process and this makes it possible to attain a satisfactory binary error rate for the extracted data.

The invention therefore proposes, in order to improve the channel equalization performance at reception, to use the first subset of learning symbols that gives a lowest possible binary error rate, below a determined threshold, instead of using all the learning symbols of the learning sequence.

According to one aspect, this determined threshold corresponds appreciably to a binary error rate computed when the first reception module works in continuous reception mode.

The invention also relates to a method for controlling an optical network comprising a plurality of source nodes and destination nodes. Such a method comprises a step of determination, for at least one of the source nodes, of a source wavelength and of instants of sending optical bursts of multi-carrier data signals obtained by modulation of a source signal at the source wavelength, as a function of a path time of the data bursts between the source node and one of the destination nodes, associated with the source wavelength. A data burst comprises, in addition to the payload data symbols, a sequence of learning symbols comprising a plurality of learning symbols.

According to the invention, the step of determination also comprises the determining of a size of said sequence of learning symbols of said single-band data bursts.

The invention also relates to a computer program product comprising program code instructions for the implementing of such a control method when it is executed by a processor.

The invention also relates to a method for sending data in an optical network comprising a plurality of source nodes and destination nodes. Such a method comprises a step for generating a multi-carrier optical data signal obtained by modulation of a source signal at a source wavelength and a step for sending the multi-carrier optical data signal in the form of single-band data bursts that can be associated with distinct source wavelengths. A single-band data burst comprises, in addition to payload data symbols, a sequence of learning symbols comprising a plurality of learning symbols.

According to the invention, such a sending method comprises:
- a step of reception of command signals comprising a piece of information on an instant of sending of the single-band data bursts, a piece of information pertaining to a source wavelength to be used for the sending of the single-band data bursts, and a piece of information pertaining to a size of the sequence of learning symbols of single-band data bursts.

In addition, the step of generation comprises an adaptation of the size of the sequence of learning symbols of the single-band data burst as a function of the information received.

The invention also relates to a computer program product comprising program code instructions to implement such a sending method when it is executed by a processor.

The invention also relates to a method of reception of data in an optical method comprising a plurality of source nodes and destination nodes. Such a method comprises a step for receiving optical bursts of a multi-carrier data signal obtained by modulation of a source signal at a source wavelength, a burst comprising, in addition to the payload data symbols, a sequence of learning symbols comprising a plurality of learning symbols. Such a reception implements a channel equalization comprising a step for computing channel equalization coefficients from the sequence of learning symbols.

According to the invention, such a method of reception also comprises a step for receiving command signals comprising a piece of information on the size of the sequence of learning symbols of the single-band data bursts and the channel equalization takes account of the information on the size of the sequence of learning symbols for the computation of equalization coefficients.

The invention also relates to a computer program product comprising program code instructions for the implementing of such a method of reception when it is executed by a processor.

Finally, the invention relates to a command signal of a source node in an optical network comprising a plurality of source nodes and destination nodes. Such a command signal comprises a piece of information on a source wavelength and a piece of information on instants of sending by the source node of optical bursts of multi-carrier data signals obtained by modulation of a source signal at the source wavelength.

According to the invention, a data burst comprising, in addition to the payload data symbols, a sequence of learning symbols comprising a plurality of learning symbols, a command signal also comprises a piece of information on a size of the sequence of learning symbols of the single-band data bursts.

The invention is also aimed at providing a recording carrier or medium readable by a computer on which there is recorded a computer program comprising program code instructions for the execution of the steps of one of the different methods of the invention as mentioned here above.

Such a recording medium can be any entity or device whatsoever capable of storing the program. For example, the medium can comprise a storage means such as a ROM, for example, a CD ROM or microelectronic circuit ROM or again a magnetic recording means, for example a USB memory stick or a hard disk drive.

Besides, such a recording medium can be a transmissible carrier such as an electrical or optical signal that can be conveyed by an electrical or optical cable, by radio or by other means so that the computer program that it contains is executable at a distance. The program according to the invention can be especially uploaded to a network for example the Internet.

As an alternative, the recording carrier can be an integrated circuit into which the program is incorporated, the circuit being adapted to executing or to being used for the execution of the above-mentioned method.

BRIEF DESCRIPTION OF THE DRAWINGS

Other aims, features and advantages of the invention shall appear more clearly from the following description given by way of a simple illustrative and non-exhaustive example with reference to the appended figures, of which.

DETAILED DESCRIPTION OF CERTAIN ILLUSTRATIVE EMBODIMENTS

The general principle of the invention relies on the dynamic adaptation of the size (expressed in integer numbers of learning symbols or in duration) of the learning sequence for the OFDM frames transmitted in an optical network implementing a transmission of multi-carrier signals by bursts in order to improve the channel equalization carried out by the receivers, and optimize the payload bit rate. Such a dynamic adaptation relies on the implementing of an improved control plane elaborated by a centralized control unit.

Figure 3:
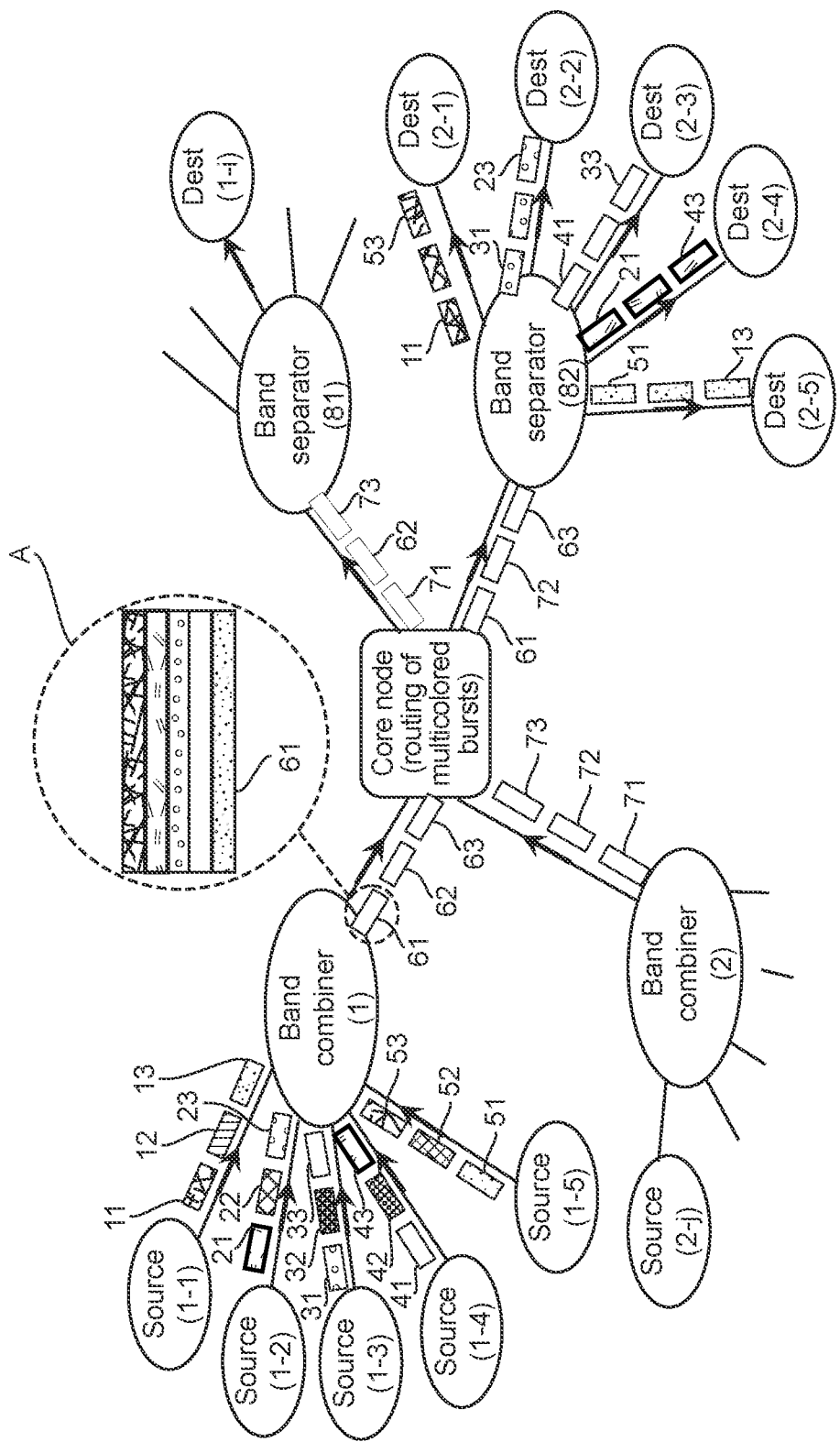
FIG. 3 illustrates an example of a TISA type optical network in which it is possible to implement the invention.

Referring first of all to FIG. 3, an example is presented of a TISA type optical network in which the invention can be implemented. It will be noted that the invention is not limited to this type of optical network but can more generally find application in any type of optical network in which the data are transmitted in the form of bursts of multi-carrier signals.

By way of an example, the invention can be implemented in a TWIN type network in which the modulation used is of the OFDM (Orthogonal Frequency Division Multiplexing) type and therefore in which the OFDM single-band multi-carrier bursts (i.e. using a single frequency band, for example the 50 GHz band) are transmitted on wavelengths associated with the destination nodes of such a TWIN network.

Here below however, the description of one particular embodiment of the invention is situated in the context of a TISA network in which multi-band OFDM multi-carrier bursts (also called MB-OFDM bursts, for example constituted by four independent single-band OFDM signals using distinct frequency sub-bands within a same frequency band, for example 50 GHz) are transmitted on spectral sub-bands associated with the destination nodes of such a TISA network.

Such an optical network comprises a set of source nodes in which we have more particularly represented, by way of examples, sources referenced 1-1, 1-2, 1-3, 1-4, 1-5 and 2-j. Each of these sources sends out OFDM single-band data bursts, three of which have been shown schematically for each source. It will be noted that, to simplify the diagram of FIG. 3, only one sense of transmission has been represented but both senses are of course normally present and can be used.

Thus, the source referenced 1-1 sends out three successive OFDM single-band bursts respectively referenced 11, 12 and 13; the source referenced 1-2 sends out three successive OFDM single-band bursts respectively referenced 21, 22 and 23; the source referenced 1-3 sends out three successive OFDM single-band bursts respectively referenced 31, 32 and 33; the source referenced 1-4 sends out three successive OFDM single-band bursts respectively referenced 41, 42 and 43; the source referenced 1-5 sends out three successive OFDM single-band bursts respectively referenced 51, 52 and 53.

For a given source, the successive bursts can have different source wavelengths as illustrated schematically by the different background pattern of these bursts, which represents a different coloring of the signal sent. These source wavelengths are each associated with a destination node for which the data bursts are intended.

Each of the sources 1-1 to 2-j sends, on a spectral sub-band associated with one of the destination nodes 2-1 to 2-5 at a given point in time.

The network of FIG. 3 also comprises two routing elements, referenced 1 and 2, and called sub-band combiners. Thus, the sub-band combiner 1 receives the single-band data bursts 11-13, 21-23, 31-33, 41-43, 51-53 coming from the source nodes 1-1 to 1-5, and combines them into OFDM multi-band data bursts referenced 61 to 63. In order to simplify the diagram of FIG. 3, these bursts 61 to 63 have been represented with a blank background pattern but it must be understood that each of these bursts corresponds to the juxtaposition of OFDM single-band bursts received from the sources 1-1 to 1-5 as illustrated by the zoom A on the OFDM single-band data burst 61. It will be noted that the burst 61 occupies a spectral band obtained by a juxtaposition of the spectral bands of the bursts 11, 21, 31, 41 and 51, and corresponds to the combination of these five single-band bursts.

In other words, the network elements called "sub-band combiners" combine (using the passive couplers) the N (here N=5 for the element 1) OFDM bands that constitute the OFDM multi-band channels.

In order to avoid collisions in the network and carry out an accurate recombination of the OFDM multi-band channels in the "sub-band combiner", an elaborate control plane must be implemented.

This control plane is constituted by a centralized control unit (when it is implemented), a control unit dedicated to the devices (especially the source nodes), a control channel which interconnects them and the messages exchanged on this control channel. This control plane takes account of the path times between elements of the network, for example by a mechanism for external synchronization and exchange of timestamps, or by a ranging process (verification and updating of the propagation time between the network elements whether they are source nodes, intermediate nodes or destination nodes). In other words, the control plane concerns the set of devices and operations needed for the command of the network.

This control plane implements exchanges of messages between the source nodes, the destination nodes and the control units to provide information about the communications needs of the source nodes, the occupancy of the receivers in the destination nodes or the source nodes. For example, by a periodic sending of reports to the control unit (preferably centralized), the source nodes provide information on the state of their queues, while the control units inform the source nodes about the dates at which they can send to the destination nodes. In another example, the control unit receives a request for bandwidth between several network elements by means of a control plane from a customer device (for example GMPLS (Generalized Multi-Protocol Label Switching) request) coming from the routers).

Such a control plane can be implemented in a centralized control unit controlling the scheduling of the data bursts addressed to all the destination nodes. Such a control unit manages all the reservations in assigning, to each source node, resources to be used to transmit data bursts to any unspecified destination. It informs the source nodes of the instants at which they must send, using a "requests and grants" mechanism.

The control unit implements computation algorithms to determine the instants of sending and receiving and assigns grants for sending bursts with messages of authorization for sending to the source nodes.

This control plane must know the path time between the different elements of the network so as to decide the appropriate points in time for sending OFDM single-band bursts.

Within the framework of the invention, such a control plane allocates the time slots of the bursts and the OFDM bands on which they are to be transmitted as efficiently as possible and manages the source nodes so that these source nodes send out bursts in the time slots and the OFDM bands thus allocated so that the MB-OFDM bursts are perfectly combined in the band combiners 1 and 2 of FIG. 3.

The messages exchanged between the source node and the control unit comprise various pieces of information, including for example a piece of information on the bandwidth used by a source node.

This piece of information comprises for example the optical carrier number as well as the information on the number of sub-carriers, the modulation format, the parameters related to the FEC and, as the case may be, other pieces of information related to the OFDM embodiment such as the cyclic prefix, the pilot sub-carrier and learning symbols.

These pieces of information enable especially the control unit to compute the duration of the bursts. The control unit can also use these pieces of information to inform a destination node at reception of the type of OFDM signal that it must receive and the instant at which it must receive it so that the receiver of the destination node can if necessary, adjust its parameters in preparation for reception. In this case, the control plane includes messages known as "setting" messages sent by the control unit to the destination node, this message comprising parameters for setting at reception.

In another embodiment, the sending by a source node on a given band can also have transmission characteristics that are different (in terms of number of sub-carriers, modulation format and bit rates) from one burst to another and this can be the case for a same destination node or for different destination nodes. The control unit can originate the changes in characteristics, for example to take account of variable conditions of transmission or to adjust the bit rate to the load.

In this case, the request messages integrate intermediate parameters enabling the control unit to make its authorization computations, especially with regard to the sending instant but also the bit rate, the modulation format, the sub-carriers, etc. The authorization messages also integrate these parameters so that the adaptation of the bursts is done according to the computations of the control unit. Finally, additional messages can advantageously be transmitted to the destination nodes so that their receivers can adapt as a function of these parameters.

Especially, within the framework of the invention, these messages comprise the size of the learning sequence of the OFDM multi-carrier signals sent out in the form of bursts by the source nodes.

The MB-OFDM data bursts coming from the combiners of the sub-bands 1 and 2 are then routed up to a core node which is an OFDM multi-band burst routing node referenced 7; such a core node is similar to the nodes used in the TWIN solution of the prior art. Indeed, in the embodiment of the invention illustrated in FIG. 3, the optical infrastructure for the transportation and routing can be the same as that of a classic TWIN solution as described especially by A. Triki et al in "*Efficient control plane for passive optical burst switching network*", ICOIN 2013, pp. 535-540. Such core nodes 7 can be constituted by demultiplexers with a preset spectral plan or else by wavelength selective switches (WSS) so as to enable a (slow) reconfiguration of the network especially in the case of scenarios for protecting vehicle traffic by the network. The demultiplexers and/or the WSS are associated with wavelengths to carry out the branching out function of the core node.

Such core nodes 7 direct the MB-OFDM bursts according to their color, i.e. their wavelengths. Thus, among the bursts 61, 62 and 63 received from the combiner 1, the bursts 61 and 63 are branched out towards a sub-band separator 82 to serve a set of destination nodes 2-1 to 2-5 and the burst 62 is branched out towards a sub-band separator 81 to serve a set of destination nodes 1-*i*. Similarly, among the bursts 71, 72 and 73 received from the sub-band combiner 2, the bursts 71 and 73 are routed towards the sub-band separator 81 and the burst referenced 72 is directed towards the sub-band separator 82.

Such sub-band separators 81 and 82 are constituted by highly wavelength-selective filters (with a bandwidth of 10 GHz for example) used in the multi-band OFDM solutions. These filters can be implemented by means of a "free space optics" technology (with a monochromatic diffraction grating) or else a more compact LCoS (Liquid Crystal on Silicon) type technology by combining a diffraction grating and a matrix of LCoS pixels for the directing or branching out, these technologies being widely used by industrial firms today.

At output of the sub-band separator 82, each of the MB-OFDM bursts 61, 72 and 63 are again separated into five OFDM single-band bursts which, depending on their wavelength, are directed towards one of the destination nodes 2-1 to 2-5. We thus find the bursts referenced 11 and 53 directed towards the receiver 2-1; the bursts referenced 31 and 23 directed towards the receiver 2-2; the bursts referenced 41 and 33 directed towards the receiver 2-3; the bursts referenced 21 and 43 directed towards the receiver 2-4; the bursts referenced 51 and 13 directed towards the receiver 2-5.

Thus, in the network of FIG. 3, the multi-band OFDM bursts are seen and processed as multi-colored bursts with two multiplexing stages.

It will be noted that the system illustrated in FIG. 3 can be applied to a network comprising edge nodes as well as, possibly, network core nodes. The edge nodes can contain a single source or several sources (on the sending side) and one receiver or several receivers (on the reception side) as illustrated in FIG. 3, given that to ensure two-way communications, the edge nodes contain a sending part and a receiving part. The network core nodes correspond to the combination and/or passive directing functions (without O/E/O conversion) in such a network, implemented by the sub-band combiner, the core node (routing of the multi-colored bursts) and the sub-band separator illustrated in FIG. 3.

The network of FIG. 3 relies on a solution with tuning at source, in which the laser used for each band of the OFDM multi-band signal is tunable so as to send out each burst on the wavelength of the destination receiver.

As explained here above, the destination nodes 2-1 to 2-5 are not sure of receiving a stream of symbols continuously because the traffic is sent in the form of bursts. When the receiver of either of these destination nodes does not receive data, only the noise at the input of the receiver is present: the term used is "gap" or "absence of signal". Since the receiver is designed to receive streams of signals continuously, the OFDM bursts received at the input of the receiver after a gap undergo, at least at the first nanoseconds, a distortion due to the phenomena of transient response of the opto-electronic components embedded in the receiver.

To compensate for these distortion phenomena and improve channel equalization in the receiver, the solution of the invention relies on an increase in the size of the learning sequence as compared with those of the prior-art solutions. This size however is adapted to the state of the traffic in the network and the expected duration of the gaps at input to the different destination nodes, and this is done in order to optimize the payload bit rate in the network.

Figure 4:
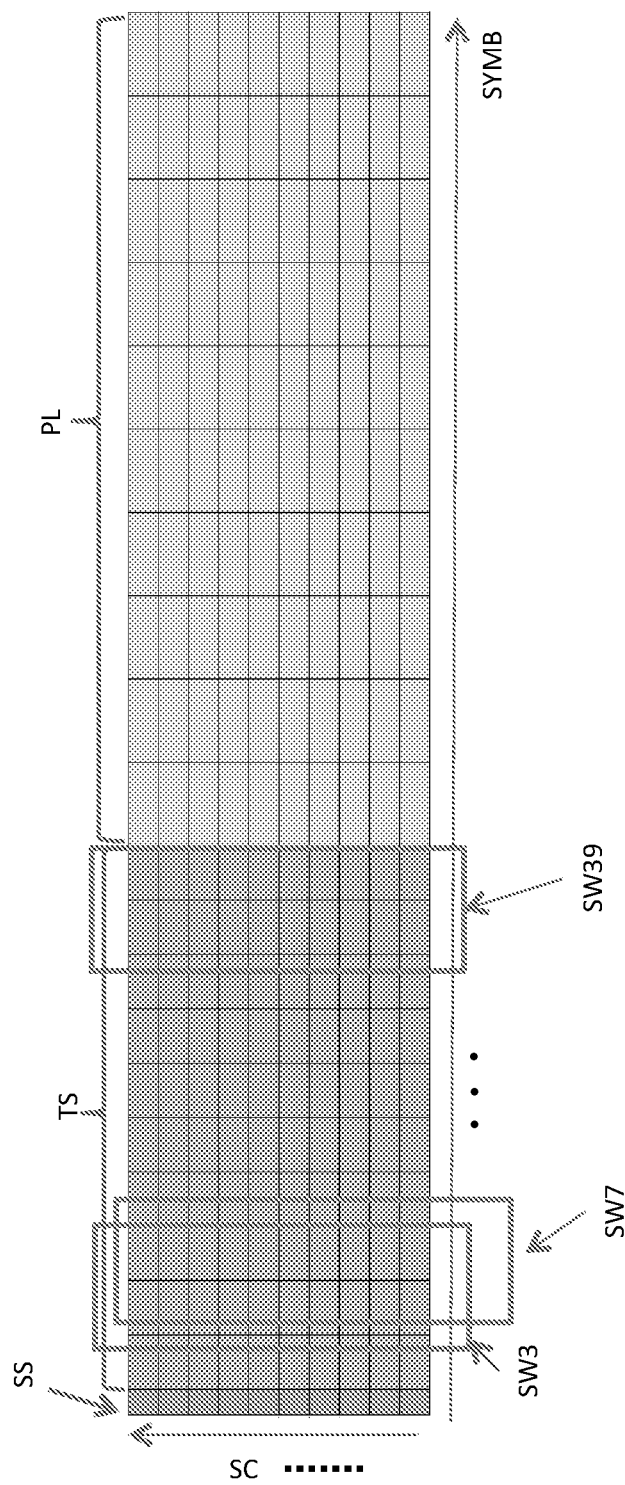
FIG. 4 presents an example of an embodiment of a channel equalization in one of the destination nodes 2-1 to 2-5 and 1-$i$ of FIG. 3.

Referring now to FIG. 4, we present an example of an embodiment of channel equalization in one of the destination nodes 2-1 to 2-1 (or 1-$i$) of FIG. 3.

It will be noted assumed that, in the transmitter of one of the source nodes 1-1 to 1-5, OFDM frames are built, composed of one synchronization symbol SS, fifty learning symbols TS and one hundred and twenty payload data symbols that can be grouped together in a payload PL. In this way, a 4.7-microsecond frame, namely one with the same duration as in a classic mode of operation, is formed wherein an OFDM frame comprises one synchronization symbol SS, fourteen learning symbols TS and one hundred and fifty-six payload data symbols.

Figure 1A:
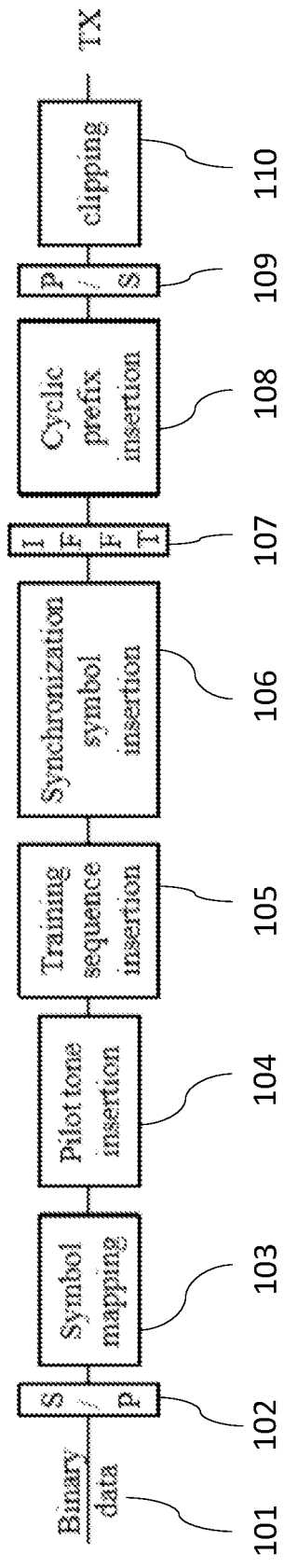
FIGS. 1A and 1B illustrate the different steps of the digital processing of the OFDM signal implemented on the transmitter side (FIG. 1A) and the receiver side (FIG. 1B) in a TISA type optical network.
Figure 1B:
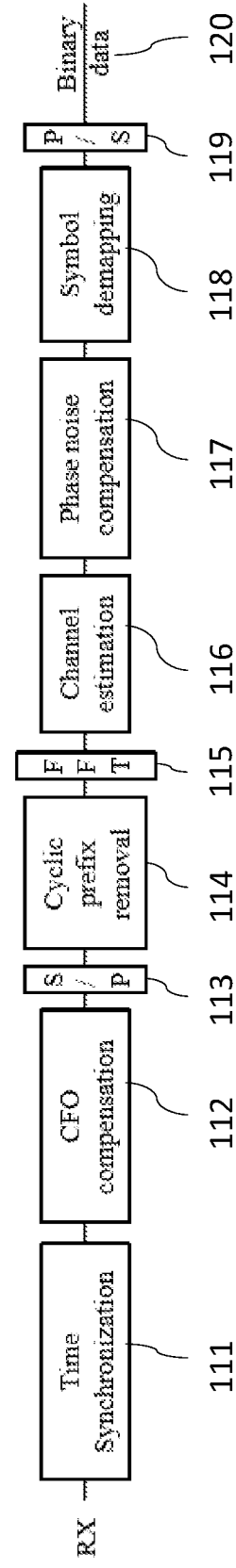

The digital signal processing (DSP) implemented in the receiver is identical to the one described here above with reference to FIG. 1B. By contrast, at the equalizer 26, the equalization coefficients are computed, averaged on the basis of a subset of twelve successive learning symbols, for example the $3^{rd}$ to the $14^{th}$ learning symbol TS. This number of twelve learning symbols TS for averaging the coefficients of the equalizer is chosen to increase the robustness to noise of the channel equalizer. Another even number value (i.e. 8, 10, 14) can also be selected.

In the example of FIG. 4, the columns represent the symbols SYMB and the rows represent the sub-carriers SC. The first column referenced SS represents the synchronization symbol. The following columns referenced TS represent the learning symbols where a block represents five learning symbols; the last columns referenced PL represent the payload data symbols, where one block represents twelve symbols. The rectangles referenced SW represent different sliding windows of learning symbols within the learning sequence TS. In this example, a window SW has a size of twelve learning symbols and the position of the first symbol of the window is called a "starting position" and gives its name to the window. Thus, the window SW3 represents the window from the $3^{rd}$ to the $14^{th}$ symbol, the window SW7 represents the window from the $7^{th}$ to the $18^{th}$ learning symbol and so on and so forth. Between two adjacent windows SW, for example four offset learning symbols are chosen. In other implementations, it is possible to choose a greater or smaller number of offset learning symbols.

Thus, according to one embodiment of the invention, the operation starts, during a first step, by computing the averaged equalization coefficients in relying on the learning symbols of a first subset SW3. We then compute the binary error rate affecting the data extracted from the receiver by using the equalization coefficients thus computed. This binary error rate is stored in a temporary memory of the receiver.

These steps are reiterated, for the same frame, in using another subset of twelve learning symbols, offset by four learning symbols relative to the subset SW3, namely the subset referenced SW7, comprising the symbols of the learning sequence TS from the $7^{th}$ to the $18^{th}$. From the equalization coefficients computed on the basis of these subsets SW7, the binary error rate affecting the data extracted from the receiver is again computed from these equalization coefficients. This binary error rate is again stored in a temporary memory of the receiver.

Thus successive iterations are performed in shifting the sliding window SW at each time by four learning symbols TS, and doing so until the end of the learning sequence is reached.

Figure 5:
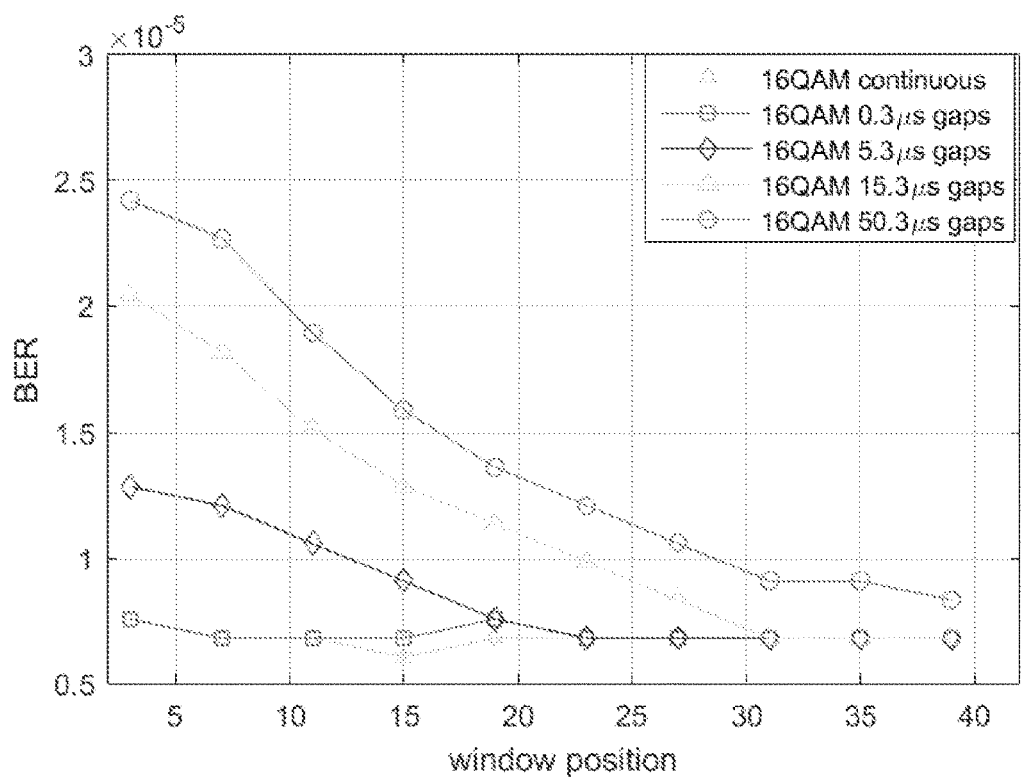
FIG. 5 presents binary error rate curves obtained for each of the successive positions of the sliding window SW used in the equalization process of FIG. 4.

The results of the binary error rate obtained for each of the successive positions of the sliding window SW are illustrated in FIG. 5. As in the case of FIG. 2, an OFDM multi-carrier signal with 16QAM modulation is considered.

In this FIG. 5, the curve marked with stars corresponds to the binary error rate affecting the data, as a function of the position of the sliding window SW, when the receiver of the destination node works in a continuous mode. In this mode of continuous operation, the binary error rates remain substantially constant whatever the position of the sliding window SW used within the learning sequence. Indeed, the frame does not undergo any distortion in continuous mode, which does not generate harmful transient response phenomena of the opto-electronic components.

The curve marked with squares, diamonds, triangles and circles respectively represent the results measured for an operation of the receiver in "burst" mode with absences of signal or gaps of 0.3 μs, 5.3 μs, 15.3 μs and 50.3 μs respectively.

A comparison of these different curves makes it possible to note that the phenomenon of distortion continues all the longer as the duration of the gaps is great. However, for all these curves it is noted that, starting from a certain position of the sliding window SW, the binary error rate gets stabilized around a value substantially equal to that of the binary error rate in continuous-mode operation of the receiver.

In order to improve the performance of the receiver, the solution of the invention consists, instead of using all the learning symbols of the learning sequence TS to compute the coefficients of the equalizer, in using only the first subset SW of 12 learning symbols which gives the lowest possible binary error rate. As a variant, it is possible to choose a binary error rate threshold, starting from which it is estimated that the distortion is low enough to be overlooked, and select the subset of learning symbols that make it possible to attain this binary error rate threshold. In one preferred embodiment, it is chosen to keep the subsets of learning symbols with which a binary error rate is obtained at a value substantially equal to the one obtained for an operation of the receiver in continuous mode.

Figure 6:
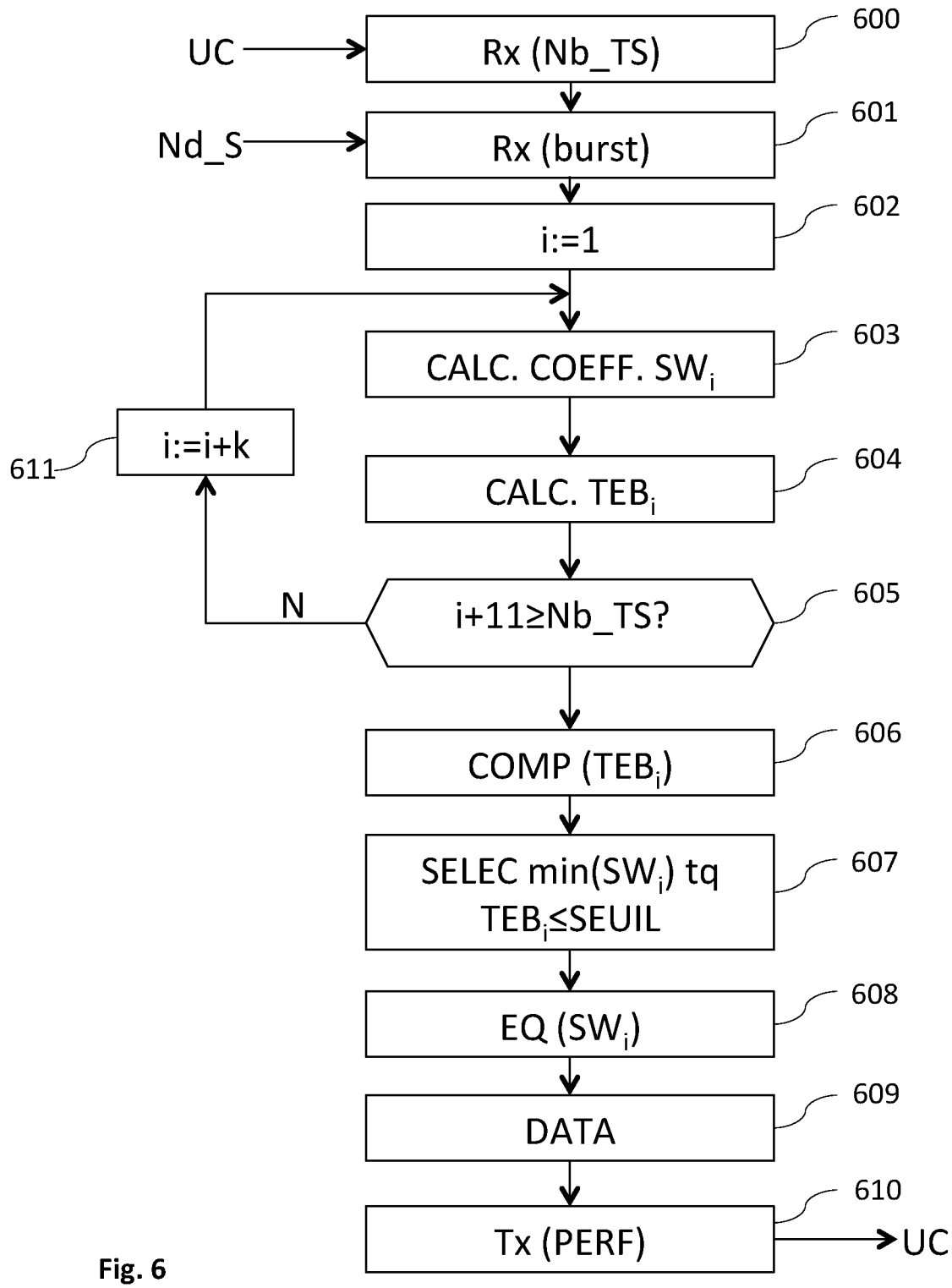
FIG. 6 is a flowchart illustrating the different steps implemented in the receiver of a destination node of FIG. 3, according to one embodiment of the invention.

FIG. 6 is a flowchart illustrating the different steps implemented in the receiver of a destination node of FIG. 3, according to one embodiment of the invention.

During a step referenced 600, the reception module of one of the destination nodes 2-1 to 2-5 receives information coming from the control unit UC of the network, and especially the size of the learning sequence TS contained in the OFDM frames of the data bursts that it will receive, typically expressed in the form of the number of learning symbols Nb_TS contained in this learning sequence TS. As a variant, the size of the learning sequence can be expressed in duration, expressed in time-measurement units which can be converted by the destination node into a number of learning symbols Nb_TS. This piece of information is for example contained in a message called a "setting" message sent by the control unit to the destination node, comprising setting parameters at reception, such as the type of OFDM signal that it must receive and the date at which it must receive it.

At reception 601 of a data burst coming from a source node Nd_S, the receiver of the destination node implements an iterative channel equalization process. As described here above, this iterative process is initialized (step 602) for a starting position i=1 corresponding to the first learning symbol of the learning sequence of the received OFDM frame. During a step 603, the receiver computes the channel equalization coefficients according to a known method, but on a subset $SW_i$ of twelve learning symbols starting at position i. It then computes 604 the binary error rate affecting the data obtained at output of the digital processing chain of FIG. 1A in using the channel equalization coefficients computed at the step 603.

In the course of a step 605, a test is made to see if the end of the learning sequence has been attained, as a function of the number of learning symbols Nb_TS communicated by the control unit UC at the step 600. If this is not the case, the steps 603 to 605 are reiterated for a new position of the sliding window $SW_i$, offset by a predetermined number k of learning symbols (step 611) relative to its preceding position. This offset (i=i+k) can especially be an offset by two learning symbols (i=i+2) when a dual polarization is used (the learning symbols being added by groups of two) or even a single learning symbol (i=i+1) when OFDM signals with single polarization are used.

If the end of the learning sequence is reached, the receiver makes a comparison of the binary error rates obtained for each position i of the sliding window SW, during a step 606. It then selects (607) the first sliding window $SW_i$ position that makes it possible to attain a binary error rate $TEB_i$ lower than a determined threshold which can correspond to a binary error rate obtained for an operation of the receiver in continuous mode. It then carries out the channel equalization 608 by using the equalization coefficients computed from learning symbols of the subset chosen at the previous step and thus obtains data referenced DATA during a step 609.

The sending module of the receiver then transmits (610), to the control unit UC, a piece of information on the performance (for example the binary error rate) of the data that it has extracted for this particular burst and this particular size of the learning sequence. It can especially send back to the control unit UC the position of the window of learning symbols that it has used for the channel equalization 608.

This piece of information can be used by the control unit UC to adapt the size of the learning sequence to be inserted in the next OFDM frames addressed to this destination node, as shall be seen in greater detail here below.

Figure 7:
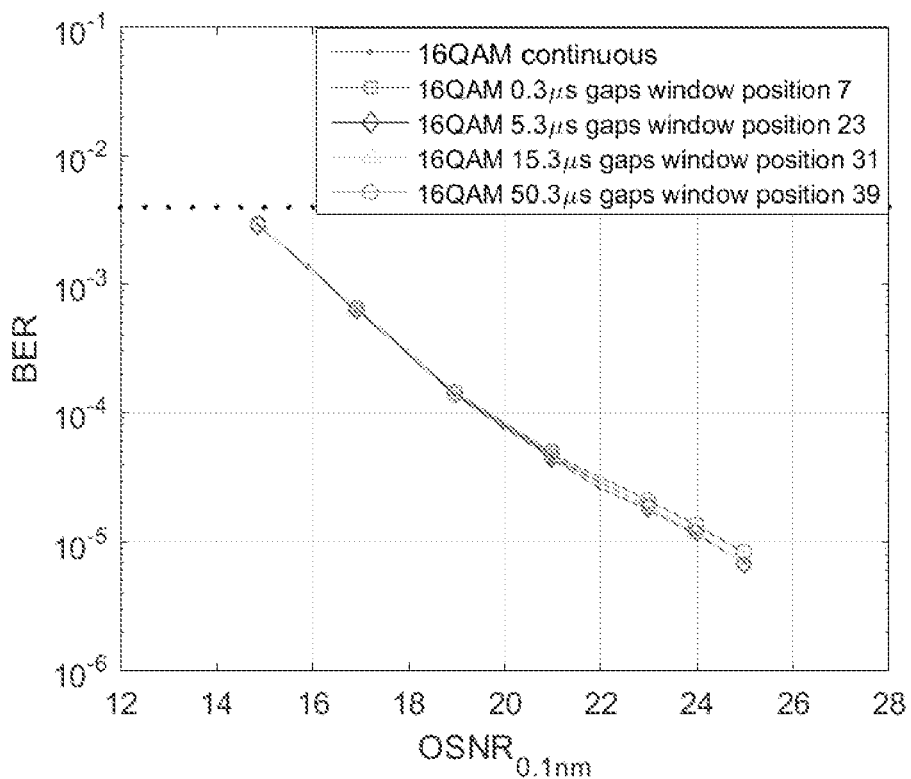
FIG. 7 presents binary error rate curves BER as a function of the optical signal-to-noise ratio OSNR at 0.1 nm for different durations of "gaps" associated with different positions of the sliding window of learning symbols, in the embodiment of FIG. 4.

FIG. 7 illustrates the performance of this method for computing channel equalization coefficients and presents the binary error rate BER curves as a function of the optical signal-to-noise ratio OSNR at 0.1 nm for different "gap" durations associated with different positions of the sliding window of learning symbols. As here above, we consider an OFDM multi-carrier signal with 16QAM modulation.

The curve marked with dots corresponds to the curve obtained for an operation in the receiver in continuous mode. The curve marked with squares represents the binary error rate results measured for an operation of the receiver in "burst" mode with gaps of a duration of 0.3 μs and by using the sliding window SW7 that starts at the $7^{th}$ symbol TS of the learning sequence. The curve marked with diamonds represents the binary error rate results measured for an operation of the receiver in "bursts" mode with gaps of a duration of 5.3 μs and by using the sliding window SW23 which starts at the $23^{rd}$ symbol TS of the learning sequence. The curve marked with triangles represents the binary error rate results measured for an operation of the receiver in "bursts" mode with gaps of a duration of 15.3 μs and by using the sliding window SW31 which starts at the $31^{st}$ symbol TS of the learning sequence. Finally, the curve marked with circles represents the binary error rate results measured for an operation of the receiver in "bursts" mode with gaps of a duration of 50.3 μs and by using the sliding window SW39 which starts at the $39^{th}$ symbol TS of the learning sequence.

By comparison with the curve obtained in continuous mode of operation of the receiver, it is observed that the performance expressed in terms of binary error rate is almost identical, especially at the bottom part of the curve (i.e. for high OSNR values) where the imperfections of the measuring system are the most significant: the difference in performance between the continuous mode and the burst mode for a binary error rate of $2\times10^{-5}$ is almost zero.

Figure 2:
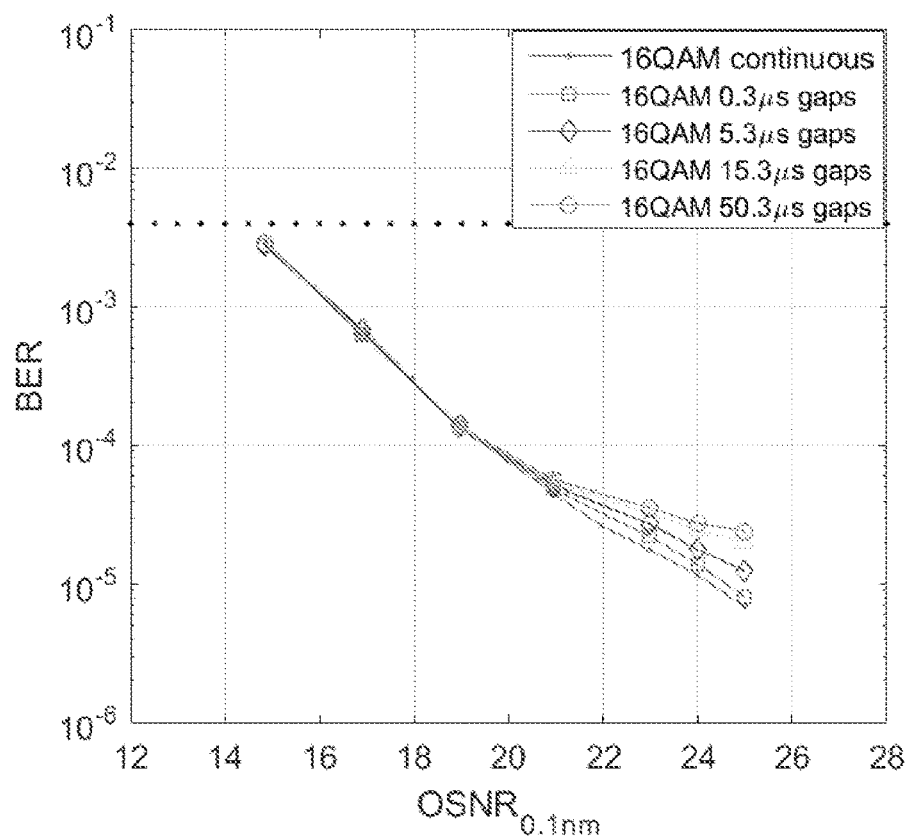
FIG. 2 presents binary error rate (BER) curves as a function of the optical signal-to-noise ratio (OSNR) measured for a 16QAM OFDM frame received at input of a receiver after different durations of absence of signals.

The comparison of these results with those illustrated in FIG. 2 shows that the solution of the invention is efficient for managing the problem of the absence of signals or "gaps" at the receiver in the case of a transmission with coherent reception in burst mode.

Such a solution, which consists in increasing the size of the learning sequence and in using only a subset of this sequence for the channel equalization by use of a sliding window makes it possible to make the OFDM receiver work both in continuous mode and in burst mode, at the cost of a simple moderate increase in the overhead (header including the learning sequence). Thus there is a saving in development costs of a receiver that is specifically designed to work in "bursts" mode with optimized opto-electronic components or again a saving in the costs associated with the generation of a padding signal as proposed earlier in the prior art.

Figure 8:
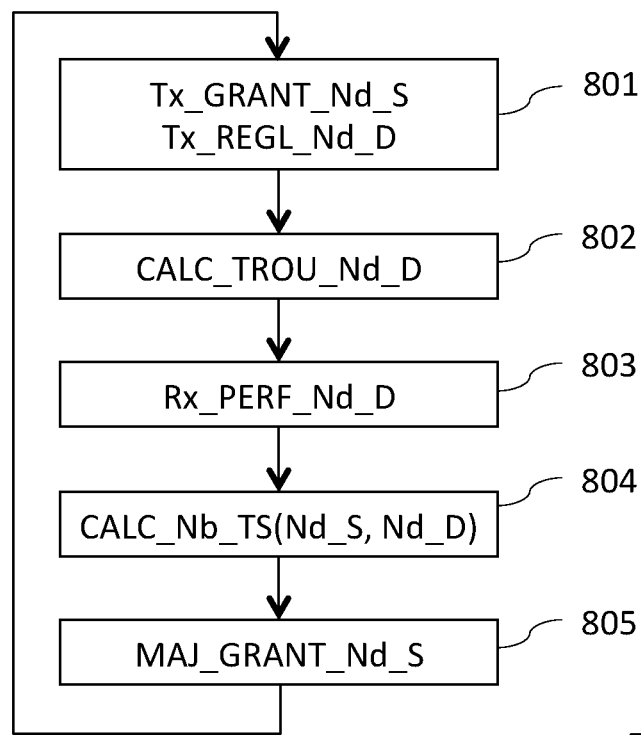
FIG. 8 is a simplified flowchart illustrating the different steps implemented in the control unit UC of the TISA network of FIG. 3.

Here below, referring to FIG. 8, we present a simplified flowchart of the different steps implemented in the control unit UC of the TISA network of FIG. 3.

The experimental results obtained from the equalization method of FIG. 6 show that it is not always necessary to insert fifty learning symbols TS in the OFDM frame to obtain satisfactory performance at reception. The sliding window of learning symbols $SW_i$ can be positioned in the middle of the learning sequence in certain situations: for example, for a gap duration of 15.3 microseconds, the equalization coefficients can be obtained for a sliding window starting at the position 31, to obtain optimal performance. It is therefore advantageous to reduce the number of inserted learning symbols and thus improve the payload flowrate within the network in dynamically adapting the size of the learning sequence by means of the control plane established by the control unit UC (in this example, by limiting it to 42 learning symbols).

The description is situated in a configuration where the control unit UC has, during a step 801, transmitted command signals GRANT to the source nods Nd_S of the network as well as reception setting symbols REGL to the destination nodes Nd_D. As indicated here above, these signals contain different pieces of information, pertaining for example to the instants of sending and receiving data bursts, but also according to the invention a piece of information on the number of learning symbols Nb_TS inserted or to be inserted into the OFDM frames (or a piece of information pertaining to the TIME duration of the learning sequence). These signals GRANT and REGL can be exchanged between the control unit and the nodes by means of a dedicated control channel.

In a TISA network, the routing is based on the wavelength and each wavelength is associated with a destination or destination node. The path of transmission from a source node to a destination node is therefore foreseeable and the propagation time between the source and the destination can be computed by the control unit. Since the instants of the sending of bursts by source nodes Nd_S are controlled by the control plane, the instants of reception by the destination node Nd_D and therefore the duration of the "gaps" between the bursts at the level of a destination node Nd_D can be foreseen by the control plane and computed by the control unit UC during a step 802.

Besides, as referred to here above with reference to FIG. 6, the destination nodes Nd_D can give the control unit UC a feedback on the performance of each of the data bursts received. This information on performance is received by the control unit UC during a step 803. It will be noted that this is a classic and known technique for computing performance of data received. The computed performance values are usually sent back to the control plane and are monitored so as to generate, if necessary, alerts for example when performance deteriorates. This step, which is known in the prior art, shall therefore not be described in greater detail herein.

Thus, the control unit can make precise control of the transmission of a burst in the network by a source node Nd_S and then obtain its performance, coming from the destination node Nd_D.

At this stage, the control unit UC can compute 804 the number of learning symbols Nb_TS needed for each link (Nd_S, Nd_D) from a source towards a destination on the basis of the duration of the gaps, the performance of the bursts already received, and as a function of the number of learning symbols that have been inserted, when sending, in these bursts.

The control unit can then update 805 the command signals or "grants" addressed to the source nodes Nd_S and especially the new parameter on size of learning sequence to be used to control the structure of the OFDM frame inserted by the source nodes into the bursts.

The control unit can then again send these grants 801 to the source nodes to modify the number of learning symbols Nd_TS to be inserted into the OFDM frames in order to adapt them to the different links point by point (from the source Nd_S to the destination Nd_D). We are thus assured that the bursts contain only the number of learning symbols needed to obtain an optimal performance at reception, thus optimizing the payload bit rate of the network.

It will be noted that the rate of updating of the command signals or grants depends on the variability of the traffic and can be configured as the function of the size of the network and of needs. For example, it is possible to modify them at each millisecond, according to the refresh rate chosen for the control plane.

The characteristics of the bursts can thus be adapted to the load of the link (day, night, congested traffic, uncongested traffic, etc.) to attain optimal performance and make better use of the network resources.

This solution finds advantageous application in optical networks relying on transmission in burst mode that offer smaller latency than present-day networks relying on circuits switching, especially in the context of data center network type applications ("inter and intra data centers") and 5G core networks that require fast configuration times when demands for resources develop.

Figure 9:
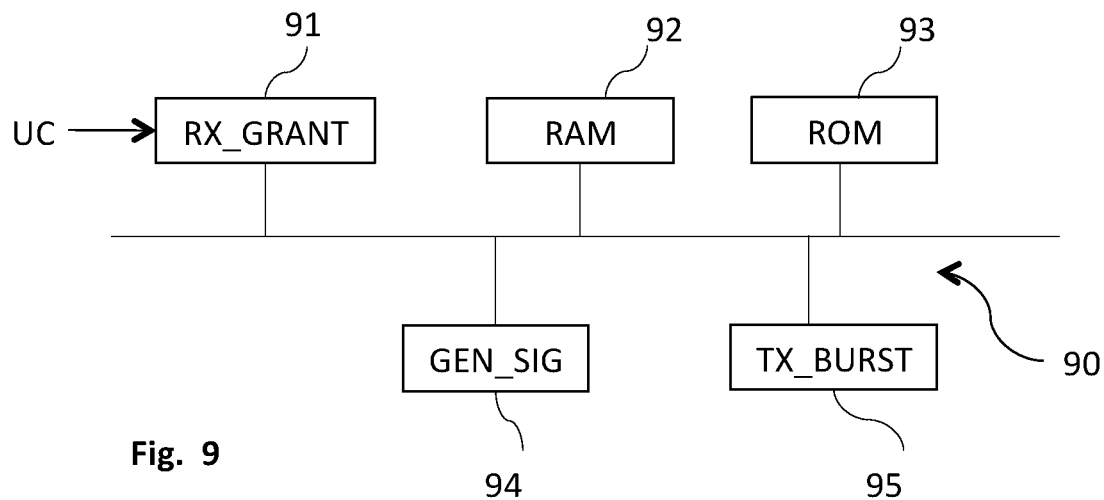
FIGS. 9 and 10 are block diagrams illustrating the hardware structure of a source node and a destination node according to one embodiment of the invention.
Figure 10:
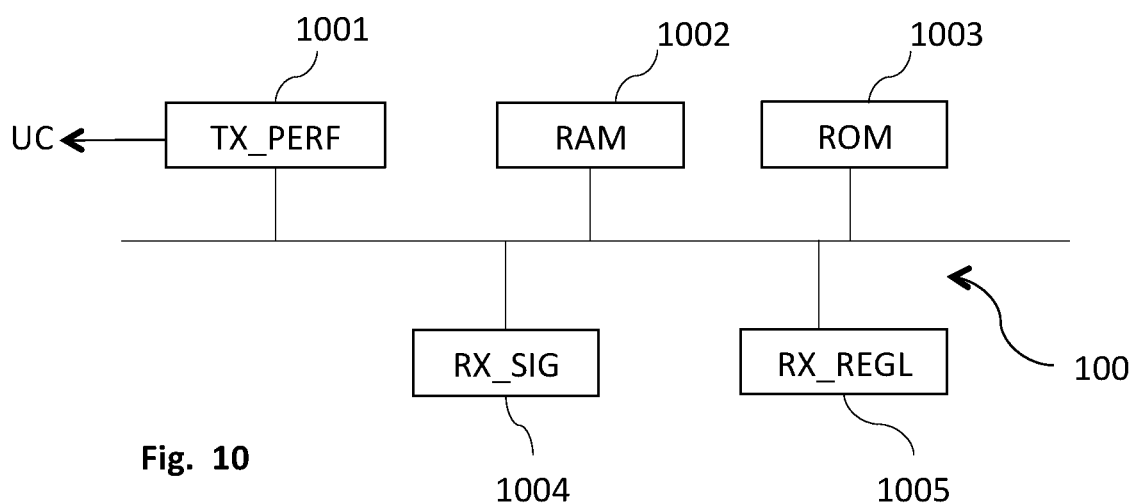

FIGS. 9 and 10 are block diagrams illustrating the hardware structure of a source node Nd_S and a destination node Nd_D according to the invention.

As illustrated in FIG. 9, a source node 90 comprises a module 91 for receiving command signals RX_GRANT, a module 94 for generating an OFDM data multi-carrier signal GEN_SIG and a module 95 for sending this signal in the form of single-band data bursts TX_BURST.

The term 'module' can correspond here equally well to a software component and to a hardware component or to a set of hardware and software components, a software component itself corresponding to one or more computer programs or sub-programs or more generally to any element of a program capable of implementing a function or a set of functions.

The module GEN_SIG 94 has especially been described in greater detail here below with reference to FIG. 1A. A reference could also be made to the patent document WO2016/020602 for an example of an embodiment of the module TX-BURST 95.

More generally, such a source node Nd_S90 comprises a live memory 92 (for example a RAM), a module for generating an OFDM data multi-carrier signal GEN_SIG 94 equipped for example with a processor and controlled by a computer program, stored in a read-only memory 93 (a ROM or a hard disk drive). At initialization, the code instructions of the computer program are for example loaded into a live memory 92 and then executed by the processor of the module GEN_SIG 94. Similarly, the module TX_BURST 95 for sending the OFDM multi-carrier signal in the form of data bursts can be equipped for example with a processor and controlled by a computer program stored in the read-only memory 93. At initialization, the code instructions of the computer program are for example loaded into the live memory 92 and then executed by the processor of the module TX_BURST 95.

The live memory 92 makes it possible especially to temporarily store the information contained in the command signals received by the module RX_GRANT 91 namely the instants of transmission of the data bursts by the module TX_BURST 95 as well as the source wavelength and the size of the learning sequence to be used by the signal generation module GEN_SIG 94. Other pieces of information such as the bit rate or the format can also be contained in these command signals and thus stored temporarily by the live memory 92.

The different modules and components of the source node Nd_S 90 are connected by a communications bus that enables the exchange of data and information among them.

As illustrated in FIG. 10, a destination node 100 comprises a module 1001 for transmitting information on reception performance TX_PERF to the control unit of the network, a module 1004 for receiving an OFDM data multi-carrier signal RX_SIG and a module 1005 for receiving the reception parameters setting signals RX_REGL.

The term "module" can correspond equally well to a software component and to a hardware component or to a set of hardware and software components, a software component itself corresponding to one or more computer programs or sub-programs or more generally to any element of a program capable of implementing a function or a set of functions.

The module RX_SIG 1004 has especially been described in detail here above with reference to FIG. 1B.

More generally, such a destination node Nd_D 100 comprises a live memory 1002 (for example a RAM), a module for receiving an OFDM data multi-carrier signal RX_SIG 1004 equipped for example with a processor and controlled by a computer program stored in a read-only memory 1003 (a ROM or a hard disk drive). At initialization, the code instructions of the computer program are for example loaded into a live memory 1002 and then executed by the processor of the module RX_SIG 1004. This module RX_SIG 1004 implements especially the iterative channel equalization process described here above with reference to FIG. 6, and therefore comprises units for computing channel equalization coefficients and computing binary error rate affecting the data. Similarly, the module TX_PERF 1001 for sending reception information on data reception performance to the control unit of the network can be equipped for example with a processor, and controlled by a computer program, stored in the read-only memory 1003. At initialization, the code instructions of the computer program are for example loaded into the random-access memory 1002 and then executed by the processor of the module TX_PERF 1001.

The random-access memory 1002 makes it possible especially to temporarily store the information contained in the reception setting signals received by the module RX_REGL 1005, namely the instants of reception of the data bursts by the module RX_SIG 1004, as well as the size of the learning sequence contained in the OFDM frames of these bursts.

The different modules and components of the destination node Nd_D 100 are connected by a communications bus that enables them to exchange data and information with one another.

What is claimed is:

1. A system for sending data in an optical network comprising a plurality of source nodes (Nd_S) and destination nodes (Nd_D), the system comprising:
    a source node (Nd_S) configured to generate a multi-carrier optical data signal obtained by modulation of a source signal at a source wavelength and sending the multi-carrier optical data signal in the form of single-band data bursts that can be associated with distinct source wavelengths;
    a single-band data burst comprising, in addition to payload data symbols (PL), a sequence of learning symbols (TS) comprising a plurality of learning symbols; and
    a control unit (UC) belonging to a control plane of the optical network, being configured to determine, for at least one of the source nodes (Nd_S) instants of sending of the single-band data bursts and source wavelengths to be used for sending the single-band data bursts, as a function of a path time of the data bursts between the source node and one of the destination nodes (Nd_D) associated with the source wavelength,
    wherein the control unit (UC) also determines a size of the sequence of learning symbols (TS) of the single-band data bursts.

2. The system of claim 1, wherein the control unit comprises a module for sending command signals (GRANT) intended for the source nodes and compliant with the control plane, comprising:
    a piece of information indicative of an instant of sending of the single-band data bursts;
    a piece of information indicative of a source wavelength to be used for the sending of the single-band data bursts;
    a piece of information (Nb_TS) indicative of the size of the sequence of learning symbols of the single-band data bursts.

3. The system of claim 1, wherein the control unit comprises a module for computing:
    a duration of absence of signal at input of at least one of the destination nodes, as a function of the instants of sending of the single-band data bursts by the source nodes and the path times of the data bursts between the source nodes and the destination node;
    wherein the size of the sequence of learning symbols of the single-band data bursts intended for the destination node, is computed as a function of the computed duration of absence of signal.

4. The system of claim 3, wherein the control unit also comprises a module for receiving information on reception performance for the reception of the single-band data bursts coming from the destination nodes, and in that the computation module is configured to update the size of the sequence of learning symbols of the single-band data bursts as a function of the information on reception performance received by the control unit.

5. An optical source node (Nd_S) of an optical network comprising a plurality of source nodes and destination nodes, the optical source node comprising:
    a module for generating a multi-carrier optical data signal obtained by modulation of a source signal at a source wavelength and a module for sending the multi-carrier optical data signal in the form of single-band data bursts that can be associated with distinct source wavelengths;
    a single-band data burst comprising, in addition to payload data symbols (PL), a sequence of learning symbols (TS) comprising a plurality of learning symbols; and
    a reception module for receiving command signals comprising a piece of information indicative of an instant of sending of the single-band data bursts and a piece of information indicative of a source wavelength to be used for sending the single-band data bursts;
    wherein the command signals (GRANT) also comprise a piece of information (Nb_TS) on a size of the sequence of learning symbols (TS) of the single-band data bursts; and
    wherein the generation module is configured to adapt the size of the sequence of learning symbols of the single-band data bursts as a function of the information received.

6. An optical destination node (Nd_D) of an optical network comprising a plurality of source nodes and destination nodes, the optical destination node comprising:
    a first reception module for reception of optical bursts of a multi-carrier data signal obtained by modulation of a source signal at a source wavelength; and
    a burst of data comprising, in addition to payload data (PL) symbols, a sequence of learning symbols (TS) comprising a plurality of learning symbols,
    wherein the first reception module comprises a channel equalizer configured to compile channel equalization coefficients from the sequence of learning symbols,
    wherein the optical destination node also comprises a second reception module for receiving command signals comprising a piece of information (Nb_TS) on the size of the sequence of learning symbols (TS) of the data bursts; and
    wherein the channel equalizer takes account of the piece of information on the size of the sequence of learning symbols for computing equalization coefficients.

7. The optical destination node of claim 6, wherein computing the channel equalization coefficients is iterative and comprises:

a computation of the channel equalization coefficients by averaging a subset of learning symbols of the learning sequence;

a computation of a binary error rate affecting payload data obtained at output of the first reception module from the channel equalization coefficients computed on the subset of learning symbols; and an offset of the subset of learning symbols within the learning sequence; and wherein the channel equalizer is configured to compare the binary error rates computed for each of the subsets of successive learning symbols and select, as equalizing coefficients to be applied by the channel equalizer, of the channel equalizing coefficients obtained by taking the average on the first of the subsets of learning symbols associated with a computed binary error rate below a determined threshold.

8. The optical destination node of claim 7, wherein the determined threshold corresponds substantially to a binary error rate computed when the first reception module operates in continuous reception mode.

9. A method of controlling an optical network comprising a plurality of source nodes and destination nodes, the method comprising:

determining for at least one of the source nodes, a source wavelength and instants of sending optical bursts of multi-carrier data signals obtained by modulation of a source signal at the source wavelength, as a function of a path time of the data bursts between the source node and one of the destination nodes, associated with the source wavelength, each data burst comprising, in addition to a plurality of payload data symbols (PL), a sequence of learning symbols (TS) comprising a plurality of learning symbols; and determining of a size of the sequence of learning symbols (TS) of the single-band data bursts.

10. A non-transitory computer program product comprising program code instructions to implement the method according to claim 9 when executed by a processor.

11. A method of sending data in an optical network comprising a plurality of source nodes and destination nodes, the method comprising:

generating a multi-carrier optical data signal obtained by modulation of a source signal at a source wavelength and sending the multi-carrier optical data signal in the form of single-band data bursts that can be associated with distinct source wavelengths, wherein a single-band data burst comprises, in addition to a plurality of payload data symbols (PL), a sequence of learning symbols (TS) comprising a plurality of learning symbols; and receiving command signals comprising a piece of information indicative of an instant of sending of the single-band data bursts, a piece of information indicative of a source wavelength to be used for the sending of the single-band data bursts, and a piece of information indicative of the size of the sequence of learning symbols of the single-band data bursts, wherein the generating comprises processing a size of the sequence of learning symbols of the single-band data bursts as a function of the information received.

12. A non-transitory computer program product comprising program code instructions to implement the method according to claim 11 when executed by a processor.

13. A method of reception of data in an optical method comprising a plurality of source nodes and destination nodes, the method comprising:

receiving optical bursts of a multi-carrier data signal obtained by modulation of a source signal at a source wavelength, a burst comprising, in addition to payload data symbols (PL), a sequence of learning symbols (TS) comprising a plurality of learning symbols; and implementing a channel equalization comprising processing channel equalization coefficients from the sequence of learning symbols; and receiving command signals comprising a piece of information indicative of a size of the sequence of learning symbols of the data bursts, wherein the channel equalization takes into account the information on the size of the sequence of learning symbols for the computation of the equalization coefficients.

14. A non-transitory computer program product comprising program code instructions to implement the method according to claim 13 when executed by a processor.

15. A source node in an optical network comprising a plurality of source nodes and destination nodes, wherein the source node is configured to receive a command signal comprising a piece of information indicative of a source wavelength and a piece of information indicative of instants of sending, by the source node of optical bursts of multi-carrier data signals obtained by modulation of a source signal at the source wavelength, each data burst comprising, in addition to a plurality of payload data symbols (PL), a sequence of learning symbols (TS) comprising a plurality of learning symbols, the command signal further comprising a piece of information indicative of a size of the sequence of learning symbols of the single-band data bursts.

* * * * *